US005373156A

United States Patent [19]

Franzen

[11] Patent Number: 5,373,156

[45] Date of Patent: Dec. 13, 1994

[54] METHOD AND DEVICE FOR THE MASS-SPECTROMETRIC EXAMINATION OF FAST ORGANIC IONS

[75] Inventor: Jochen Franzen, Bremen, Germany

[73] Assignee: Bruker-Franzen Analytik GmbH, Bremen, Germany

[21] Appl. No.: 9,794

[22] Filed: Jan. 27, 1993

[30] Foreign Application Priority Data

Jan. 27, 1992 [DE] Germany ............................ 4202123

[51] Int. Cl.[5] ...................... H01J 49/16; G01N 27/62

[52] U.S. Cl. ...................................... 250/288; 250/282

[58] Field of Search ..................... 250/288, 288 A, 282

[56] References Cited

U.S. PATENT DOCUMENTS 4,531,056 7/1985 Labowsky et al. ................. 250/282
4,861,988 8/1989 Henion et al. ...................... 250/282

FOREIGN PATENT DOCUMENTS 0169057 1/1986 European Pat. Off. .
0200027 11/1986 European Pat. Off. .
2198579 6/1988 United Kingdom .
9104781 4/1991 WIPO .

OTHER PUBLICATIONS

Quadrupole Storage Mass Spectrometry, J. Wiley & Sons (1989), pp. 331–344.
international Journal Of Mass Spectrometry And Ion Processes, W. H. Guest, (1984) pp. 189–199.

*Primary Examiner*—Jack I. Berman

[57] ABSTRACT

Heavy-weight, fast-moving molecular ions are slowed down in a light-weight collision gas to very low velocities and small distributions of velocity before their mass-spectrometric analysis. The velocity reduction of the ions which occurs in the collision gas reduces both ion energy and phase space. In accordance with one embodiment, in order to minimize fragmentation of large molecular ions, an ultrasonic gas jet traveling in the same direction as the ions is used for slowing down the ions. In accordance with another embodiment, the ions are examined in storage mass spectrometers such as ICR spectrometers or ion traps.

29 Claims, 1 Drawing Sheet

METHOD AND DEVICE FOR THE MASS-SPECTROMETRIC EXAMINATION OF FAST ORGANIC IONS

FIELD OF THE INVENTION

This invention relates to ion generation and, in particular, to the generation of heavy molecular ions for use with mass spectrometers.

BACKGROUND OF THE INVENTION

Methods have become known in recent years for the production of heavy molecular ions of organic substances, all of which have the disadvantage that the ions have a high average initial velocity which is the same for ions of all masses. In addition, there is a wide spread of initial velocities. The resulting ion beam fills a wide phase space and is difficult to use with conventional mass spectrometers.

More particularly, the production of ions by generating ultrasound or acoustic shock waves on the surface of solid matter was predicted some considerable time ago and is described in detail in printed German patent specification DE-PS 27 31 225. For purposes of this invention, the sound range from approximately $10^9$ to $10^{13}$ Hertz is referred to as "hypersound".

A phenomenon was recently discovered by L. N. Grigorov in which molecules in ionized form are shaken off the surface of a thin foil when the foil is bombarded with a laser pulse on the reverse side. This method is suitable for generation of ions from extremely large molecules in the order of magnitude of 1,000,000 Daltons. The method is described in detail in L. N. Grigorov, *Bulletin of the USSR Academy of Science, Dept. of Physical Chemistry*, v. 288, p. 654, 1986 (experimental setup), v. 288, p. 906, 1986 (theory) and v. 288, p. 1393 (shaking off the ions).

The theory put forward by Grigorov explains this effect by the amplification of a stationary hypersonic wave in the foil by stimulated emission of hypersound in a thin-layered field of considerable electronic excitation near the reverse surface. This effect, described by Grigorov as an "acoustor", resembles the amplification effects of microwaves and light by MASER and LASER (microwave amplification or light amplification by stimulated emission of radiation). The considerable electronic excitation of the very thin field is produced by a pumping effect of the laser pulse in the electronic states of the solid matter.

The hypersonic waves generated by the effect have frequencies of approximately $10^{11}$ Hertz. Molecules are vigorously shaken off by the considerable intensity of the longitudinal hypersonic waves passing transversely through the foil. The ions are ejected in an outwardly neutral plasma consisting of electrons and ions, more than 99% being ionized by a single charge according to estimates by Grigorov.

Irrespective of their mass, all molecules gain approximately the same acceleration from the shaking process and leave the surface with approximately the same average velocity of about 5,000 meters per second. Although the average velocity is the same, the spread of individual velocities is very large, varying from one third to three times the average velocity. Since the spread of energy corresponds to the square of the spread of velocities, the spread of energy between maximum and minimum energy for the particles of a particular mass amounts approximately to a factor of 100. Particles of various masses therefore have mass-proportional average energy.

In comparison to the length of the laser pulse, the shaking-off process lasts a relatively long time. With a pulse length of approximately 10 microseconds from a neodymium YAG laser operating without a Q-switch, the shaking-off of ions could be observed for approximately 1 millisecond with exponential decrease after the laser pulse was terminated. With this method, molecules are essentially transferred whole from the surface to a free-flying ionized state, with no observable limit apparently placed on the magnitude of the molecules. There are indications that ions up to a magnitude of 2,000,000 Daltons can be ionized whole with this method.

Another known method of ion generation is the production of whole molecular ions of high-molecular substances by matrix-assisted laser desorption. This method is described in general in "Matrix-Assisted Laser Desorption/Ionization Mass Spectrometry of Biopolymers", F. Hillenkamp et al., *Analytical Chemistry*, v. 63 p. 1193, 1991.

In accordance with this method, the molecules of the substance under examination are dispersed in a suitable organic substance (called a "matrix") and applied to a suitable base, for example a level surface on the end of a metal insertion rod. A brief focused laser light pulse lasting less than 10 microseconds (generally only 10 nanoseconds) applied to the substance/matrix mixture then produces a plasma cloud which, with a suitable matrix, consists of a mixture of essentially neutral matrix molecules and singly charged ions of the substance under examination.

With this method, the molecules of the substance under examination are for the most part transferred whole to a free-flying ionized state with no observable limit apparently placed on the magnitude of the molecules which can be ionized. Ions up to a magnitude of 300,000 Daltons have already been ionized whole with this method.

According to more recent examinations reported by R. B. Beavis and B. T. Chait, *Chemical Physics Letters* v. 181, p. 479, 1991, the ions in the quasi-exploding and, at the same time, adiabatically cooling plasma cloud are accelerated by friction with the matrix molecules. In so doing, all ions of large masses gain approximately the same average velocity of about 750 meters per second with a distribution of individual velocities varying from approximately 300 meters to 1,200 meters per second.

Both of the above-described methods have problems when used with conventional mass spectrometers. Time-of-flight mass spectrometers, which accommodate the pulsed production of ions, have so far been used with these ionization methods. On closer examination, however, time-of-flight mass spectrometers do not allow optimal results to be achieved for several reasons. More particularly, for use with a time-of-flight mass spectrometer, the ions must undergo a twofold filtration process: firstly, time filtration in order to obtain only ions from a small time window of just a few nanoseconds, and secondly, energy filtration in order to make the time-of-flight principle applicable. In addition, the ions have to be focused from a widespread phase space to a narrow phase space which, according to Liouville's theorem, is not possible with optical means.

For example, for his experiments with the laser-induced hypersound ionization method, L. N. Grigorov used a time-of-flight mass spectrometer with a Mamyrin reflector for focusing energy, and an inline energy filter. However, if an ion production period of only 100 microseconds is assumed for hypersonic production of the ions and a time window of 10 nanoseconds is taken as the time-of-flight window, only 1/10,000 of the ions produced remain usable.

Even with a time-of-flight mass spectrometer used with an energy-focusing Mamyrin reflector, focusing of energy is limited to approximately 1% of the flight energy, from which there is a further reduction to a maximum of 1/100 of the ions. The maximum usable proportion of the ions in a time-of-flight spectrometer is therefore one millionth of the total ions formed, even neglecting focusing losses of an unknown magnitude.

In addition, the laser-induced hypersonic method of ion production has a further serious drawback. At a velocity of approximately 5,000 meters per second, a singly charged ion of 2,000,000 Daltons has a kinetic energy of approximately 0.5 million electron volts. Ions with this energy can no longer be handled in a mass spectrometer of normal dimensions since fields of exceptional intensity would have to be used for focusing and deflection. Present laboratory mass spectrometers operate with maximum ion energies of approximately 50 kev.

The matrix-assisted ionizing laser desorption method described above has similar drawbacks. Although both the time window for formation and energy spread are more favorable in this instance, the divergence and thus the focusability of the ion beam, which is formed by the expanding plasma cloud, is much more disadvantageous. The phase space (customarily formed from local coordinates and velocity coordinates) is also therefore very large and unsuitable for mass spectrometry. Here too, solely time-of-flight mass spectrometers have so far been used.

Consequently, it is the task of the invention to find a method of making ions of large organic molecules, which are produced at high velocities in a widespread phase space, accessible fully and with high efficiency for mass-spectrometric examination.

SUMMARY OF THE INVENTION

The foregoing problems are solved and the foregoing task is achieved in one illustrative embodiment of the invention in which the heavy, and thus high-energy, ions are slowed down in a friction gas before the ions are subjected to mass-spectrometric examination. Both after and during velocity reduction, the ions may be focused in the friction gas by electrical guide fields (similar to the fields used in a mobility spectrometer). The ions are then fed to an inlet opening of the mass spectrometer.

A drastic reduction in phase space during focusing and velocity reduction results, however, in an enlargement of the time distribution of the ion pulse. In accordance with another embodiment of the invention, the ions can therefore be collected in a storage mass spectrometer, for example, an ion cyclotron resonance spectrometer or an RF quadrupole ion trap according to Paul, before their examination begins, thus producing favorable temporal focusing.

Irrespective of their initial energy, initial direction and time of pulsed formation, the ions can therefore be subjected to an efficient examination. With suitable focusing, more than one percent of the ions can be transferred to the mass spectrometer so that the proportion of usable ions rises by at least several orders of magnitude compared to use of a time-of-flight spectrometer for ions not slowed down.

DETAILED DESCRIPTION OF THE PREFERRED EMBODIMENTS

The collection of slow-moving heavy ions in storage mass spectrometers is known. In ion traps according to Paul, a damping gas is used in the trap in order to capture the ions in the trap. Use of ion traps for examination of ions of very high masses is also known. Very high mass resolutions have also already been obtained in the ion trap for high masses (larger than m/m = 1,000,000), far better than resolutions obtainable in time-of-flight mass spectrometers.

When colliding with helium atoms with a temperature of approximately 500 Kelvins, medium-weight molecular ions having a mass in the range of 100 u to 300 u begin fragmenting at a velocity of about 5,000 to 20,000 meters per second. This is known from use of ion traps as tandem mass spectrometers for analysis of secondary ions. Larger molecular ions are more difficult to fragment since, in this case, there is faster distribution of the collision energy over many degrees of freedom of the movement. The slowing-down of large molecules with a velocity of 5,000 meters per second is not therefore entirely uncritical since each collision with a helium atom can transmit approximately 1 eV of collision energy. Hydrogen or helium can therefore preferably be used as a friction gas.

A preferred form of the inventive method therefore consists in slowing down the ions in a friction gas jet traveling in the same direction as the ions. The gas jet can be formed so that it is adiabatically cooled during formation. The adiabatically cooled jet is not only thermally very cold, it also has a relatively large forward velocity of approximately 1,600 meters per second so that the relative velocity between the jet and the faster organic ions is substantially lower than the initial velocity of the ions. The cold gas jet (gas jets of approximately 2 kelvins have been measured) is additionally able to cool the inner states of the heavy ions, as is known from multiphoton mass spectroscopy with jet cooling.

The gas jet is increasingly broken in a distance of travel so that the ions end in an area of thermal stationary gas. The gas jet can be produced by several nozzles arranged around the place of origin of the ions. For example, the nozzles can be formed by holes drilled with a laser through the foil or conventional Laval nozzles or any other known type of nozzles. The nozzles may illustratively be arranged in a circle around the ion origin. The divergence of each individual jet amounts to approximately 20°, so that the individual jets produce a single combined jet after a short distance.

If, however, one wishes to deliberately fragment the heavy ions, for example, to gain information on the structure of the ions, heavier friction gases can be used or admixed with the lighter friction gases mentioned above.

Figure 1:
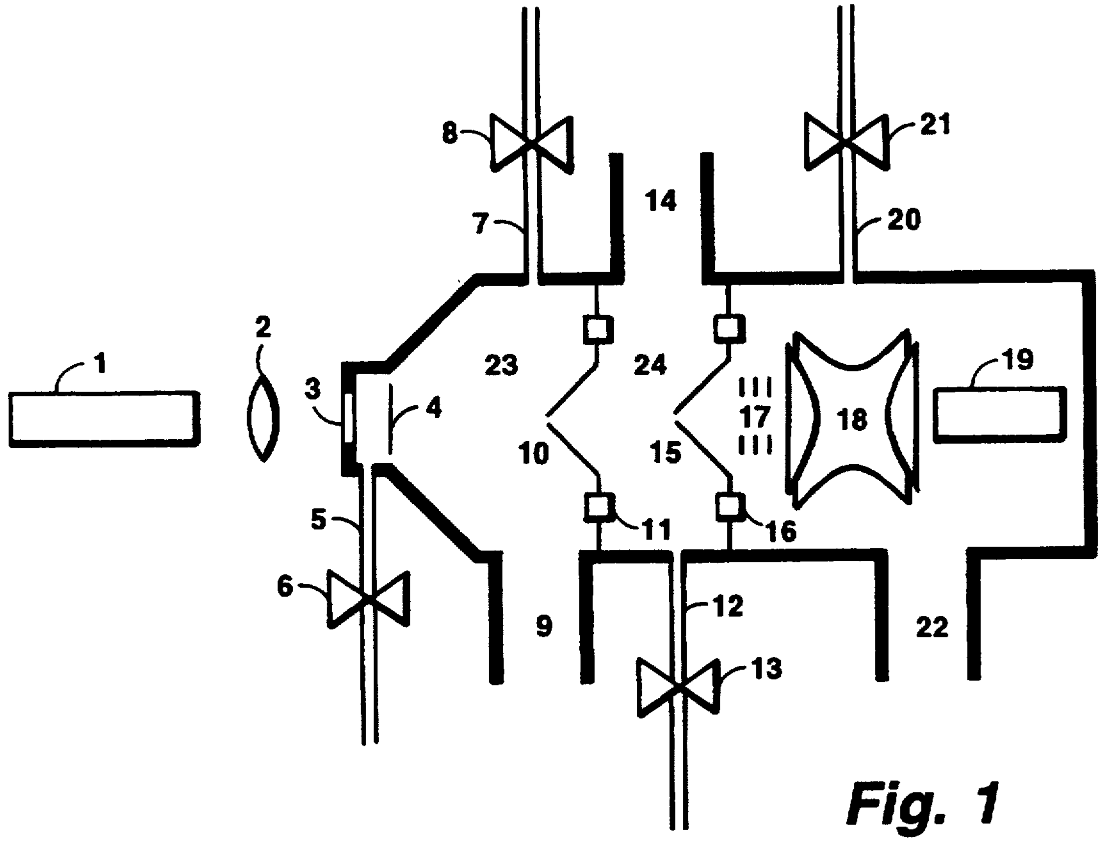
FIG. 1 is a schematic representation of an ion trap mass spectrometer for examination of surface ions generated by laser-generated hypersonic waves.

A preferred design of a mass spectrometer for hypersonically produced ions is shown in FIG. 1. A neodymium YAG laser (1) without a Q-switch produces a light pulse lasting approximately 10 microseconds with a spiked microstructure. A focal point with an energy flow density of approximately 20 $kW/cm^2$ is produced on one side of the foil (4) by means of a lens (2) and window (3).

The opposite side of the foil (4) is covered with a thin application of the substance under examination. The application only needs to be approximately 10 femtomoles per square millimeter since all of the substance with a surface area of approximately one square millimeter is shaken off ionized. In the case of a substance with a molecular weight of 1,000,000 Daltons, the application consists in an approximately 1/100 monomolecular layer.

Hydrogen is admitted into the chamber as a friction gas behind the foil (4) via valve (6) and inlet (5). The hydrogen gas streams through nozzle-like holes formed in the foil to produce gas jets traveling in the same direction as the ion beam. Gas jets with a velocity of approximately 2,000 meters per second are formed and, due to the divergence of the jets, they soon combine into a single jet in the friction chamber (23).

The ions shaken off the foil (4) at 5,000 meters per second penetrate the combined gas jet from the rear and are decelerated within approximately 10 centimeters. The gas jet itself is also largely stopped since the size of the friction chamber (23) is limited. If necessary, additional supplies of gas can be admitted into the friction chamber (23) by valve (8) and inlet (7) in order to break the gas jet. The excess gas is pumped off through the pump connection piece (9).

The pressure in the friction chamber (23) is determined by the flow of gas inlet through the pipes (5) and (7) and the flow of gas pumped off through the connection piece (9).

A skimmer (10), which takes the form of a suction electrode, with an insulator (11) feeds the largely or completely slowed ions to the skimmer opening, the ions then being carried along into the next chamber (24) by the flow of gas. This latter chamber (24) with pump connection piece (14) is for differential pressure compensation and can also be set to a required gas pressure by regulating gas flow via valve (13) and inlet (12).

The ions are then directed into the chamber of the mass spectrometer by the potential of a skimmer (15) with an insulator (16). An ion-optical lens (17) of known construction delays the ions and focuses them in known manner on the inlet opening of the RF quadrupole ion trap (18) with one ting electrode and two end cap electrodes.

In the quadrupole ion trap, the ions are slowed down by a damping gas and caught. The damping gas is fed through inlet (20) and controlled by valve (21). The mass spectrometer chamber is evacuated by pump connection piece (22).

For examination of the ions, the ion trap (18) is operated in known manner with a scanning method in which the ions are ejected mass-sequentially through holes in an end cap. The ions ejected are measured with an ion detector (19). The temporal progression of the ion signal measured is then converted into a mass spectrum in known manner (by subsequent electronic processing in electronic circuitry which is not illustrated).

In such an apparatus, a single laser shot produces approximately $10^8$ ions from the 10 femtomoles of the substance under examination on one square millimeter of the foil (4).

Of the $10^8$ ions, produced, approximately $10^6$ ions can be transferred to the ion trap (18). Approximately $10^4$ ions of this amount are finally ejected from the trap (18) and measured by detector (19). In order to obtain a high resolution, a slow scanning process with 10 milliseconds per unit of mass is necessary. A scan of 100,000 atomic units of mass therefore takes approximately 1,000 seconds or about 20 minutes. If a very high resolution is dispensed with, scanning can be carried out more quickly.

In another embodiment, instead of a permanently installed foil (4), a ribbon-like foil can also be used which can be led through the friction chamber (23) in known manner by two differentially evacuated lock systems. The nozzles for the gas jets can be arranged on both sides of the ribbon foil. The substance under examination can be placed onto the ribbon outside the chamber system, thus allowing quasi-continuous operation.

Figure 2:
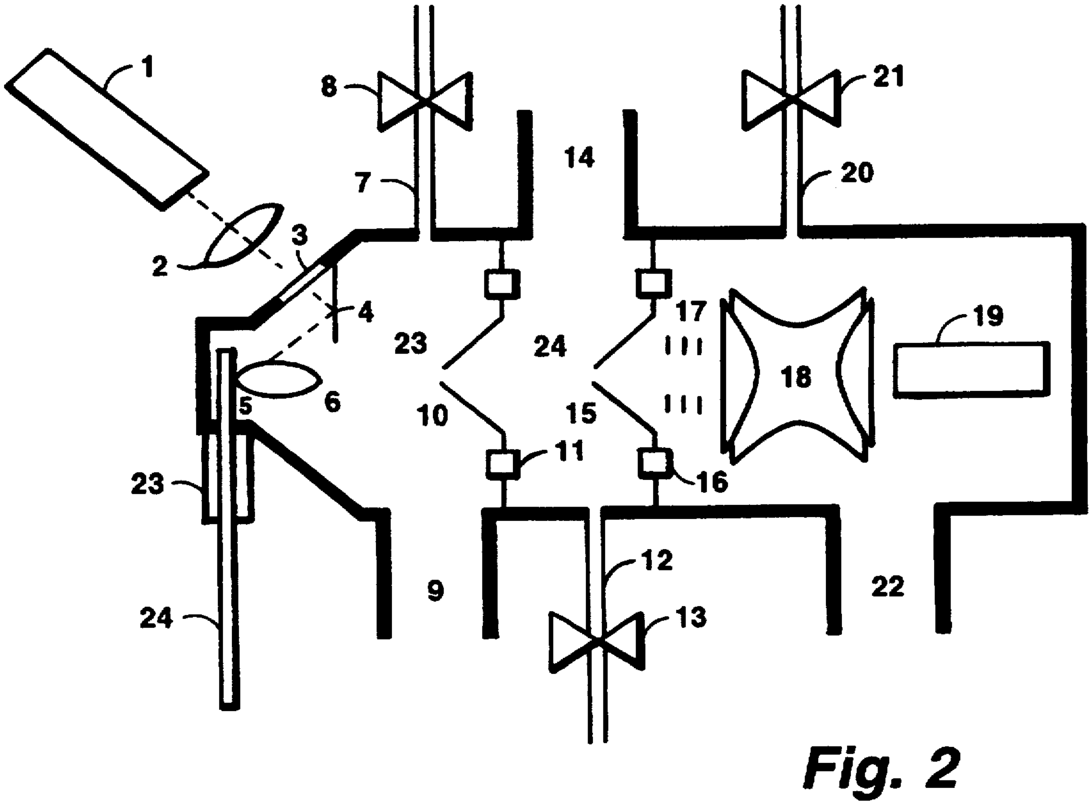
FIG. 2 is a schematic representation of an ion trap mass spectrometer for examination of heavy ions produced by matrix-assisted laser desorption.

FIG. 2 shows a preferred design of a mass spectrometer for ions produced by matrix-assisted laser desorption. Mass spectrometer parts in FIG. 2 corresponding to those in FIG. 1 have been given corresponding numerals. A neodymium YAG laser (1) with frequency quadrupling produces a light pulse lasting approximately 10 nanoseconds. A focal point is produced on a sample surface (5) of the insertion rod (24) by the lens (2), window (3) and mirror (4). The sample surface (5) of the insertion rod (24) bears a thin application of the substance under examination dispersed in a suitable matrix substance. The insertion rod can be introduced into the friction chamber (25) by a lock (23).

For this method, the application needs to be only approximately 10 femtomoles of the substance under examination per cubic millimeter in the matrix. Since a volume of approximately 1/100 of a cubic millimeter is explosively vaporized by the laser pulse and virtually 100 percent of the substance ionized by a single charge, approximately $10^8$ ions of the substance under examination are produced. The laser pulse produces a plasma plume (6).

Velocity reduction due to collisions with the friction gas in chamber (23), Further focusing and analysis of the ions in the plasma plume (6) takes place with the same structure as described in FIG. 1. Here too, suitable gas jets can be produced by nozzles, if desired. The gas jets can be formed by positioning a ring of nozzles around the plume area and introducing the friction gas at this point.

What is claimed is:

1. In a method for mass-spectrometric examination of organic ions including the steps of generating an ion beam, the ions in the ion beam having large velocities and a large velocity spread filling thus a large phase space when formed, and applying the ion beam to a mass spectrometer, the improvement comprising the step of:

A. passing the generated ion beam through a friction gas after formation but before the ion beam is applied to the mass spectrometer in order to reduce the phase space of the ions to a size suitable for mass spectrometry.

2. In a method for mass-spectrometric examination of organic ions, the improvement according to claim 1 further comprising the step of:

B. applying a focusing electrical guide field to the ions during step A.

3. A method for mass-spectrometric examination of an organic material comprising the steps of:

A. generating an ion beam from the organic material, the ion beam travelling in a direction and the ions in the ion beam having large velocities and a large velocity spread thus filling a large phase space when formed;

B. passing the generated ion beam through a friction gas in order to slow the ion velocity and reduce the phase space of the ions to a size suitable for mass spectrometry; and C. applying the ion beam to a mass spectrometer.

4. A method for mass-spectrometric examination of an organic material according to claim 3 wherein step A comprises the steps of:

A1. selecting a solid-state metal foil having a first and second surfaces;

A2. placing a sample of the organic material on the first surface of the foil; and A3. applying a laser beam to the second surface of the foil to generate hypersound waves.

5. A method for mass-spectrometric examination of an organic material according to claim 3 wherein step A comprises the steps of:

A4. mixing a sample of the material in an organic matrix substance;

A5. placing the mixture produced in step A4 on a substrate; and

A6. applying a laser light pulse to the mixture to generate an ion beam.

6. A method for mass-spectrometric examination of an organic material according to claim 3, 4 or 5 wherein step C comprises the step of:

C1. collecting the ions produced in step B in a storage mass spectrometer; and

C2. generating a mass spectra of the ions collected in step C1.

7. A method for mass-spectrometric examination of an organic material according to claim 6 wherein step C1 comprises the step of:

C1A. collecting the ions in an ion cyclotron resonance mass spectrometer.

8. A method for mass-spectrometric examination of an organic material according to claim 6 wherein step C1 comprises the step of:

C1B. collecting the ions in an RF quadrupole ion trap.

9. A method for mass-spectrometric examination of an organic material according to any one of claims 2–5 wherein step B comprises the step of:

B1. passing the generated ion beam through hydrogen or helium gas.

10. A method for mass-spectrometric examination of an organic material according to any one of claims 2–5 wherein step B comprises the steps of:

B2. forming the friction gas into at least one adiabatically-cooled gas jet traveling in substantially the direction of the ion beam; and B3. passing the ion beam through the gas jet.

11. A method for mass-spectrometric examination of an organic material according to claim 10 wherein step B2 comprises the step of:

B2 A. pulsing the at least one gas jet.

12. A method for mass-spectrometric examination of an organic material according to any of claims 2–5 wherein step B comprises the steps of:

B4. passing the generated ion beam through a friction gas which has sufficient molecular weight to cause fragmentation of the ions in the ion beam.

13. In a device for mass-spectrometric examination of an organic substance, the device having a housing, an ion beam generator located in the housing, the ions having large velocities and a large velocity spread, for production of ions from the organic substance and a mass spectrometer located in the housing, the mass spectrometer having an inlet opening for receiving the ions, the improvement comprising means for introducing a friction gas into the housing between the ion beam generator and the mass spectrometer inlet opening to reduce said velocity spread.

14. In a device for mass-spectrometric examination of an organic substance, the improvement according to claim 13 wherein the introducing means comprises at least one nozzle located near the ion beam generator, the nozzle forming the friction gas into a gas jet.

15. In a device for mass-spectrometric examination of an organic substance, the improvement according to claim 14 wherein the ions travel in a predetermined direction and the at least one nozzle is positioned with respect to the ion beam generator so that the gas jet travels in substantially the same direction as the predetermined direction.

16. In a device for mass-spectrometric examination of an organic substance, the improvement according to claim 13 wherein the introducing means comprises a plurality of nozzles located near the ion beam generator, each of the plurality of nozzles forming the friction gas into a gas jet.

17. In a device for mass-spectrometric examination of an organic substance, the improvement according to claim 16 wherein the nozzles are arranged in a ring around the ion beam generator.

18. In a device for mass-spectrometric examination of an organic substance, the improvement according to claim 17 wherein the ions travel in a predetermined direction and the plurality of nozzles are positioned with respect to the ion beam generator so that the gas jets travel in substantially the same direction as the predetermined direction.

19. A device for mass-spectrometric examination of an organic substance, the device comprising:

a housing;

an ion beam generator located in the housing for production of ions from the organic substance, the ions having large velocities and a large velocity spread;

a mass spectrometer located in the housing, the mass spectrometer having an inlet opening for receiving the ions; and means for introducing a friction gas into the housing between the ion beam generator and the mass spectrometer inlet opening.

20. A device according to claim 19 wherein the ion beam general or comprises:

a thin foil having a first surface on which a sample of the organic material can be placed, and a second surface;

a laser system for generating a laser light pulse; and means for directing the laser light pulse at the second surface.

21. A device according to any one of claims 19–20, wherein the mass spectrometer is an ion-storage mass spectrometer.

22. A device according to claim 21 wherein the ion-storage mass spectrometer is an ion cyclotron resonance mass spectrometer.

23. A device according to claim 21 wherein the ion-storage mass spectrometer is an RF ion trap storage mass spectrometer.

24. A device according to claim 19 wherein the introducing means comprises at least one nozzle located near the ion beam generator, the nozzle forming the friction gas into a gas jet.

25. A device according to claim 24 wherein the ions travel in a predetermined direction and the at least one nozzle is positioned with respect to the ion beam generator so that the gas jet travels in substantially the same direction as the predetermined direction.

26. A device according to claim 19 wherein the introducing means comprises a plurality of nozzles located near the ion beam generator, each of the plurality of nozzles forming the friction gas into a gas jet.

27. A device according to claim 26 wherein the nozzles are arranged in a ring around the ion beam generator.

28. A device according to claim 27 wherein the ions travel in a predetermined direction and the plurality of nozzles are positioned with respect to the ion beam generator so that the gas jets travel in substantially the same direction as the predetermined direction.

29. A device according to claim 19 wherein said introducing means comprises a gas inlet and a valve connected to the inlet for pulsing the gas.

* * * * *